March 17, 1931.  C. B. THORNE  1,796,632
LOG BARKER
Filed Oct. 20, 1928   2 Sheets-Sheet 1

INVENTOR.
C. B. Thorne.
BY E. J. Fetherstonhaugh
ATTORNEY.

Patented Mar. 17, 1931

1,796,632

UNITED STATES PATENT OFFICE

CARL BUSCH THORNE, OF HAWKESBURY, ONTARIO, CANADA

LOG BARKER

Application filed October 20, 1928. Serial No. 313,848.

The invention relates to a log barker, as described in the present specification and illustrated in the accompanying drawings that form part of the same.

The invention consists essentially of the novel features of construction pointed out broadly and specifically in the claims for novelty following a description containing an explanation in detail of an acceptable form of the invention.

The objects of the invention are to utilize a grate form of agitator in the disturbance of the logs within a pocket or in a less confined area whereby the grate bars or links are maintained in constant motion through the operation of crank shafts, thus applying to logs either in passage or in a pocket a continuous shaking that will keep the logs rubbing against one another in different directions of rotation; to simplify the means employed for creating turbulence throughout the logs; to facilitate the supply of logs in accordance with the capacity of the mill; and generally to provide an efficient and serviceable means of barking logs for pulp mills and lumber mills and for any other purpose desired.

In the drawings, Figure 1 is a longitudinal sectional view of a pocket having in the bottom thereof reciprocating bars and crank mechanism operating these bars.

Figure 1:
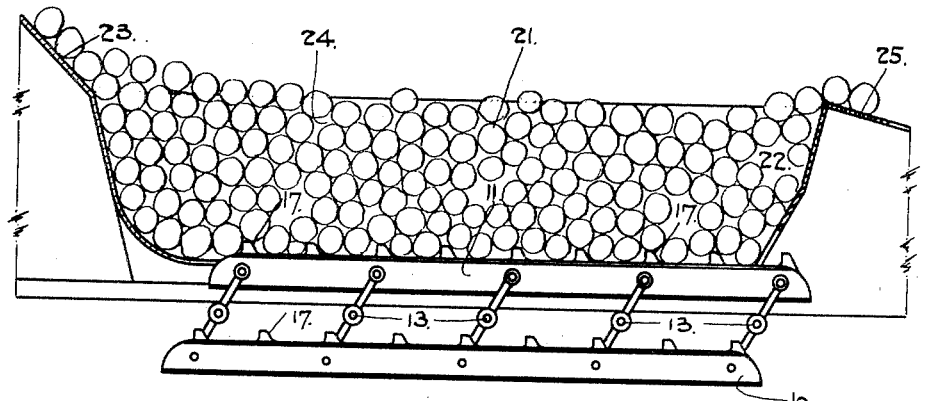

Referring to the drawings, in Figure 1 there are three reciprocatory and rotatory grates, indicated by the numerals 10, 11, and 12, these grates being operated from a plurality of crank shafts 13 from which the central cranks 14 operate and carry the central grate 11 to which they are pivotally secured at intervals.

The right and left cranks 15 and 16 respectively carry the grates 10 and 12 to which they are pivotally attached respectively, all of the grates having the cam lugs 17 for the purpose of disturbing the logs in addition to the reciprocatory and rotatory motion in the rotation of the grates.

The crank shafts 13 are journalled in the bearings 18 and 19 and one of these crank shafts is driven by a motor 20 or by suitable connecting members to any power convenient.

The grates are here shown as projecting through the bottom of the pocket 21, and in their movements pass through the rear wall 22 of said pocket, but these grates may form the bottom of the pocket or of any receptacle or platform that may be used in the collection of the logs for barking purposes, and furthermore under certain conditions it is preferable to use several sets of these grates so that the logs may simply be spread thereon and rubbed up against one another with impunity.

The logs in rolling down the inclined way 23, formed in the front wall of the hopper, land on the bottom of the hopper, and of course in the grates, and by means of these grates the logs are very much disturbed, so much so as to keep rolling against one another in a rubbing action.

The pocket or hopper 21 is enclosed on either side by the walls 24, which serve as guides for the logs fed into the pocket down the inclined way 23 or front wall.

These logs are disturbed and rolled by the cam lugs through the movements of the grate bars, so that by the time they reach the end they are pushed up by these bars and lugs and roll off on the inclined platform 25, and if required fall into another pocket.

Figure 4:
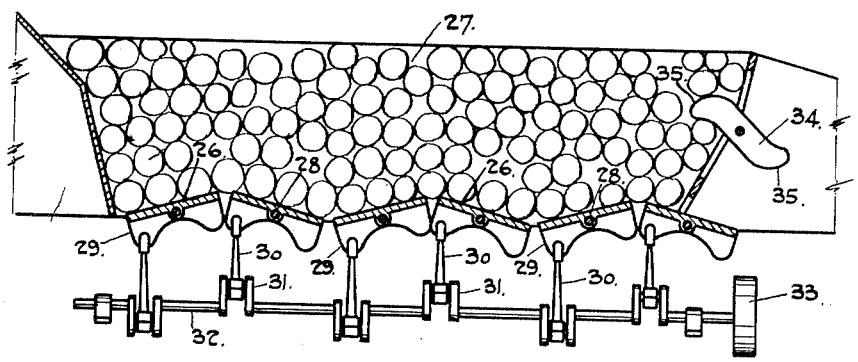
Figure 4 is a modification of the grate bars showing them in link form operated by cranks.

In Figure 4 another form of grate is shown in which the grate is formed of the plates 26, and these plates form the bottom of the pocket 27.

These plates are shown as pivoted on the transverse shafts 28 and as having the downwardly extending lugs 29 which are connected by the connecting rods 30 to the cranks 31 of the crank shaft 32, therefore the plates 26 form rocker plates.

The crank shaft is shown as driven by the pulley 33 connected to any suitable power or in any other desired manner.

In the rear wall of the pocket 27, the pivoted cam 34 is shown, having the receding faces 35 engaging the logs to help them up on the discharge end. This cam 34 is driven in any suitable manner.

Figure 5:
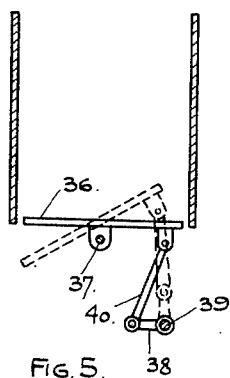
Figure 5 is a detail of a modified form of rocker member.

In Figure 5 the rocker plates 36 are shown as pivoted on a longitudinal shaft 37 and operated from the cranks 38 and the crank shaft 39 through the connecting rods 40. The only difference in the plates 26 from the plates 36 is that they rock transversely instead of longitudinally.

In this form of the invention the logs slide into the pocket in the same manner as in the grate form and are kept in a continuous state of upheaval by the plates rocking longitudinally or transversely as the case may be, and as they gradually reach the end of the pocket, they are aided up on the discharge platform by the cam 34, otherwise the invention is much the same as in the grate form, that is to say, a crank operated mechanism, whereby the logs are disturbed sufficiently to keep them rubbing against one another thereby stripping the bark.

Figure 6:
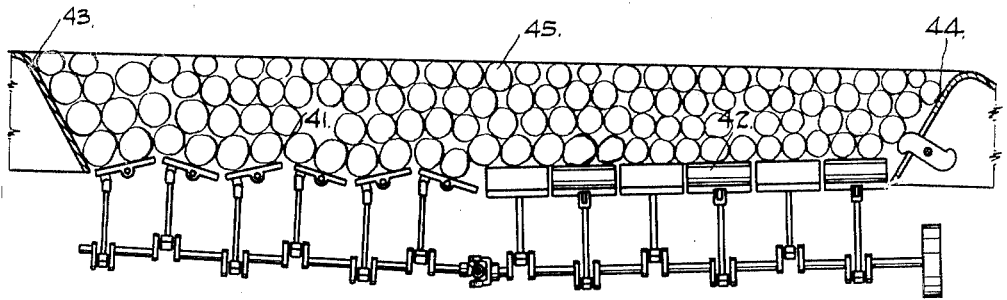
Figure 6 is a side elevation of the grate form of the invention operating outside the pocket arrangement.

In Figure 6 two forms of this invention described are joined, so as to produce a very turbulent area for the logs, but the pocket is missing and the bar grate form of section 41 is preferably inclined downwardly to meet the downwardly inclined section 42 in the plate form of grate.

The inclined runway 43 leads to the section 41 and an inclined runway 44 leads from the section 42, while suitable guides 45 extend along the sides.

The operation of the sections 41 and 42 is fully described hereinbefore and as the logs roll down the runway 43 they move on to the grate sections and are continuously disturbed until they reach the runway 44.

This runway 44 has a slight upward incline, and then inclines downwardly to the discharge. The logs may be rubbed by many groups of these grates and the grates may be arranged in any way desired.

Figure 3:
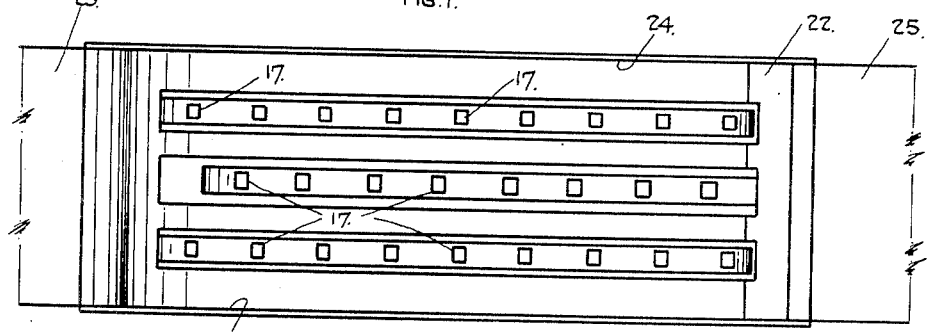
Figure 3 is a plan view of the invention as illustrated in Figure 1.
Figure 2:
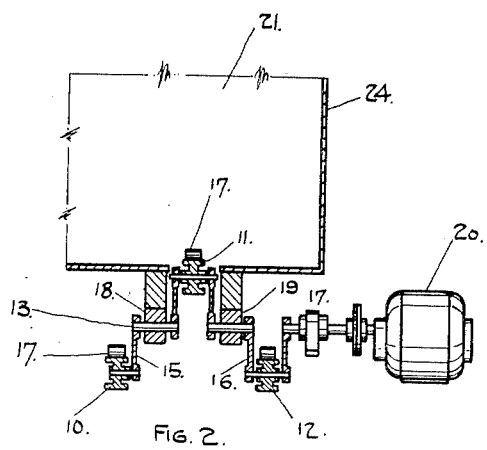
Figure 2 is a cross sectional view of the bars and crank operating means.

In the operation of this invention as illustrated in Figures 1 to 3, the logs are fed into the hopper or pocket and rest on the floor over the openings provided for the bars, the latter having a forward arcuate movement imparted by the cranks. The rear wall of the hopper is provided with openings corresponding to the openings provided in the bottom which allows the bars to pass through the rear wall at the beginning of the stroke. It will be seen that at each backward movement of the bars the flights move the entire hopper full of logs upwardly and at the same time move the lower layer of logs, that is, the logs laying directly on the bars rearwardly, naturally the logs at the front of the hopper fall down on to the bottom to take the place of the logs that have been moved rearward by the movement of the bars.

So it will be seen that at every forward movement of the bars the logs are pushed steadily up the incline at the rear end by the continual rearward movement of the logs behind on the flights which at the same time by its upward arcual movement imparts to the logs a rubbing or rolling action, which effectually barks the logs.

In the form of the invention shown in Figures 4 to 5 the logs are piled into the hopper and rest on the rocking plates at the bottom.

When the crank shaft is set in motion the plates tilt and the logs roll from one side of the plates to the other, it will be seen that the cranks are so arranged that the outer edge of one plate and the inner edge of an adjacent plate rise and fall together so that the log in rolling to the edge of the plate falls into a V formed by two plates.

At the end the rotating cams 34 keep relieving the discharge end of the pocket of logs, which has the effect of producing a continuous forward movement of the logs from the feeding end because of the action of the plates in bringing the bottommost logs always down into the V's.

What I claim is:—

1. In a log barker, a log pocket having ingress and egress ends for accumulating and discharging logs in piles and tumbling and forwarding members actuated by a crank mechanism.

2. In a log barker, parallel bars in their raised positions lifting and tumbling logs in a pile and elevatable and lowerable forwardly and rearwardly in arcuate paths and having lugs continuously moving logs forwardly to the discharge and crank mechanism having shafts and extending arms carrying said bars in rotation.

3. In a log barker, bars having lugs engaging and forwarding and tumbling the logs from a point of delivery to a point of discharge, and rotating crank members carrying said bars and suitably driven.

4. A log barker, comprising bars having lugs engaging the logs and alternately lifted to their engagement with said logs and swung in a forward direction to tumble and advance the logs.

5. A log barker, comprising a log support, crank shafts suitably driven, double cranks mounted on said shafts and bars connecting series of said cranks and having lugs for progressing the logs coincidently with their tumbling movements.

Signed at Montreal, Canada, this 20th day of September, 1928.

CARL BUSCH THORNE.